(12) United States Patent
Zarowny et al.

(10) Patent No.: US 7,957,841 B2
(45) Date of Patent: Jun. 7, 2011

(54) METHOD OF CALCULATING PUMP FLOW RATES AND AN AUTOMATED PUMP CONTROL SYSTEM

(75) Inventors: Cam Zarowny, Streamstown (CA); Wayne Muir, Lloydminster (CA); Wendell Young, Cochrane (CA)

(73) Assignee: Noralta Technologies Inc., Lloydminster (CA)

( * ) Notice: Subject to any disclaimer, the term of this patent is extended or adjusted under 35 U.S.C. 154(b) by 283 days.

(21) Appl. No.: 12/130,933

(22) Filed: May 30, 2008

(65) Prior Publication Data

US 2008/0300727 A1 Dec. 4, 2008

(30) Foreign Application Priority Data

Jun. 1, 2007 (CA) .................................... 2591395

(51) Int. Cl.
*G05D 7/00* (2006.01)
*G05D 11/00* (2006.01)
*G01F 1/00* (2006.01)
*G01F 7/00* (2006.01)
*G01F 25/00* (2006.01)

(52) U.S. Cl. .......... 700/282; 700/275; 700/281; 702/46; 702/47; 73/1.16; 73/1.33; 73/1.34; 73/1.35; 137/2; 137/7

(58) Field of Classification Search .................. 700/275, 700/281–282; 73/1.16, 1.33–1.35; 137/2, 137/7; 702/46–47
See application file for complete search history.

(56) References Cited

U.S. PATENT DOCUMENTS

| | | | |
|---|---|---|---|
| 7,055,600 B2 * | 6/2006 | Messier et al. ........... | 166/250.01 |
| 2003/0164239 A1 * | 9/2003 | Wellington et al. ........... | 166/302 |
| 2003/0192693 A1 * | 10/2003 | Wellington .................... | 166/267 |
| 2005/0279322 A1 * | 12/2005 | Kufferath ...................... | 123/299 |
| 2006/0278386 A1 * | 12/2006 | Zarowny et al. ................ | 166/53 |
| 2009/0171512 A1 * | 7/2009 | Duncan ......................... | 700/300 |

FOREIGN PATENT DOCUMENTS

CA 2510101 A1 11/2005

* cited by examiner

*Primary Examiner* — Ramesh B Patel
(74) *Attorney, Agent, or Firm* — Christensen O'Connor Johnson Kindness PLLC

(57) ABSTRACT

A method of determining a flow rate of a pump involves determining a volume capacity for a flow line carrying produced fluids from the pump, determining a starting pressure for the flow line and setting an arbitrary target pressure for the purpose of testing. The test is initiated by preventing flow in the flow line while continuing to operate the pump and monitoring pressure in the flow line to determine a time interval required to reach the target pressure. The method then involves performing calculations to determine flow rate using the volume capacity, the starting pressure, the change in pressure over the time interval required to reach the target pressure. The flow rate is equivalent to $\Delta V$ divided by a change in time $\Delta T$. The method is preferably used as part of a manual or automated pump control strategy to keep the pump operating within flow rate ranges that provide optimum pump efficiency.

4 Claims, 2 Drawing Sheets

US 7,957,841 B2

METHOD OF CALCULATING PUMP FLOW RATES AND AN AUTOMATED PUMP CONTROL SYSTEM

FIELD

The present invention relates to a method of automated pump control system that speeds up and slows down a pump in accordance with flow rates derived through the teachings of the method.

BACKGROUND

Various automated control systems are known for matching pump rotations per minute with the rate that fluids flow into a well bore of an oil well. Canadian Patent 2,510,101 (Zarowny et al.) describes a control system that is based upon the rate of rise of produced fluids in a production tank. This control system cannot be used, when multiple wells are producing fluids that accumulate in a single production tank, including wells that are flow lined.

SUMMARY

There is provided a method of determining a flow rate of a pump which involves determining a volume capacity for a flow line carrying produced fluids from the pump, determining a starting pressure for the flow line and setting an arbitrary target pressure for the purpose of testing. The test is initiated by preventing flow in the flow line while continuing to operate the pump and monitoring pressure in the flow line to determine a time interval required to reach the target pressure. The method then involves performing calculations to determine flow rate using the volume capacity, the starting pressure, the change in pressure over the time interval required to reach the target pressure. The calculations are based upon the fact that a change in pressure equals a change in volume $\Delta P = \Delta V$ in a closed system, with flow rate being equivalent to $\Delta V$ divided by a change in time $\Delta T$.

As flow rates increase, pump efficiency increases until the pump reaches a range of optimum efficiency. The range of optimum efficiency will vary with the type of pump and the viscosity of the liquids being pumped. Once the type of pump and the viscosity of the liquid are known, a range of flow rates for optimum pump efficiency can be determined. In some cases there are manufacturer's recommendations with respect to flow rates to achieve optimum pump efficiency with liquids of given viscosity. This enables the derived flow rate calculations to be used as part of a pump control strategy, whether manual or automated, in which flow rates are kept within a predetermined operating range to optimize pump efficiency.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
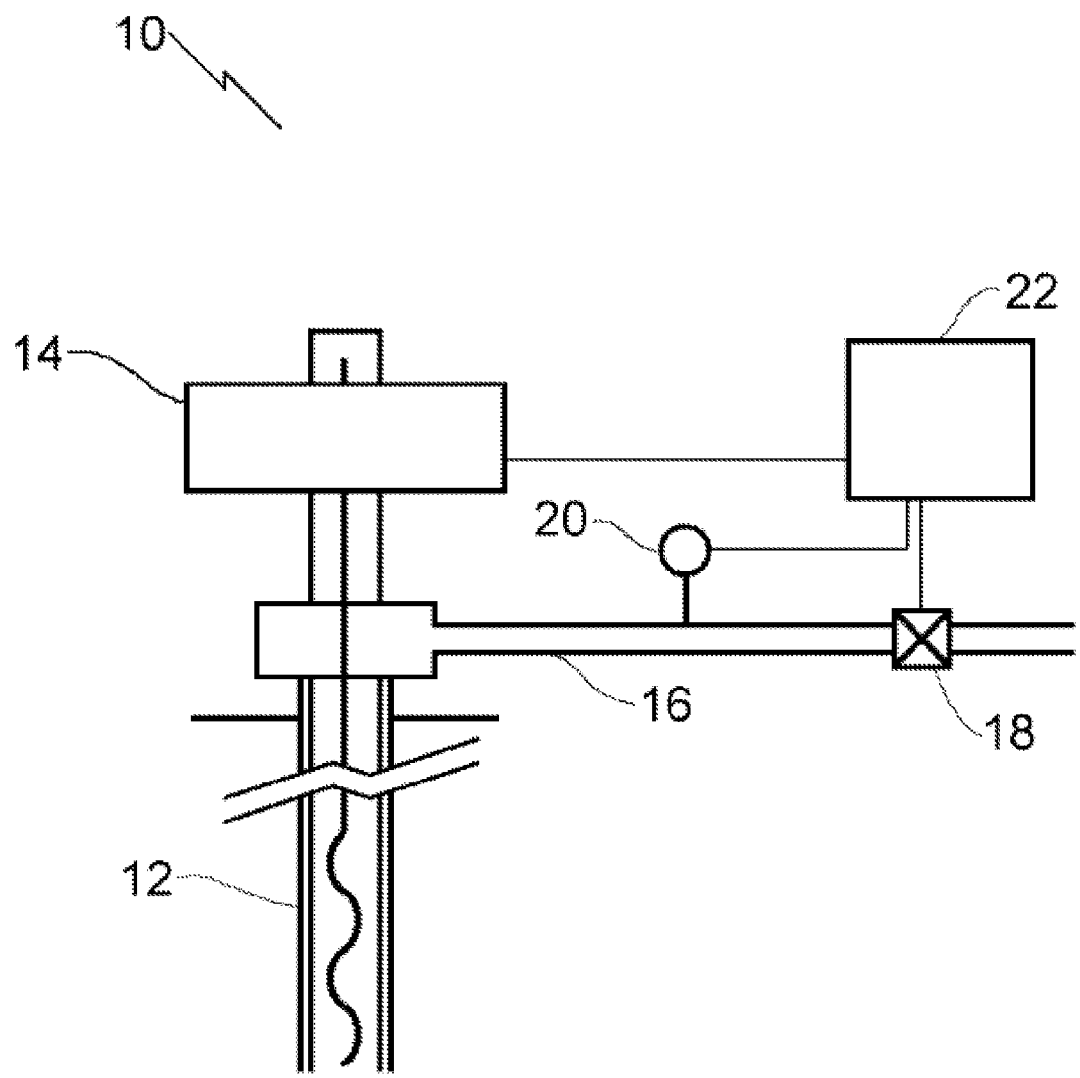
FIG. 1 is a schematic view of an automated oil well pump control.

An automated oil well pump control, generally indicated by reference numeral 10, will now be described with reference to FIG. 1.

Structure and Relationship of Parts:

Referring to FIG. 1, automated oil well pump control 10 includes an oil well 12 having a pump 14 and a flow line 16 that carries produced fluids from oil well 12. While a screw pump has been illustrated, it will be understood that other suitable types of pumps could also be used. There is also a means of controlling the flow of produced fluids, such as an automated control valve 18 on flow line 16 as depicted, with a pressure sensor 20 positioned on flow line 16 between pump 14 and control valve 18. A controller 22 is used to control the speed of pump 14, control the opening and closing of control valve 18 and receive pressure readings from pressure sensor 20. Controller 22 has a control strategy in which controller 22 determines a starting pressure, closes control valve 18, monitors a resulting rise in pressure in flow line 16 to determine the length of time it takes to arrive at a arbitrary target pressure, and then speeds up or slows down pump 14 based upon a pressure profile.

Calculations to determine flow rate use the known volume capacity, the known starting pressure, the monitored change in pressure over the monitored time interval required to reach the known target pressure. The calculations are based upon the fact that a change in pressure equals a change in volume $\Delta P = \Delta V$ in a closed system. Flow rate then become equivalent to $\Delta V$ divided by a change in time $\Delta T$.

There are a range of flow rates for optimum pump efficiency. The derived flow rate calculations can be used as part of a pump control strategy, whether manual or automated, in which flow rates are kept within a predetermined operating range to optimize pump efficiency. The operation of an automated system will now be described.

Operation:

Referring to FIG. 1, pressure sensor 20 communicates to controller 22 a starting pressure. Valve 18 is then closed on flow line 16, which is carrying produced fluids from oil well 12. Pump 14 continues to operate to pump produced fluids from oil well 12. The pressure in flow line 16 between pump 14 and valve 18 is monitored by pressure sensor 20 to determine the length of time it takes to reach an arbitrary target pressure, which establishes a pressure profile.

The controller then performs calculations to determine flow rate as $\Delta V$ divided by a change in time $\Delta T$. This simplified calculation is possible as the volume capacity is known, the starting pressure is known, the change in pressure is known and the monitored time interval required to reach the target pressure is known. The calculations are based upon the fact that a change in pressure equals a change in volume $\Delta P = \Delta V$ in a closed system.

Figure 2A:
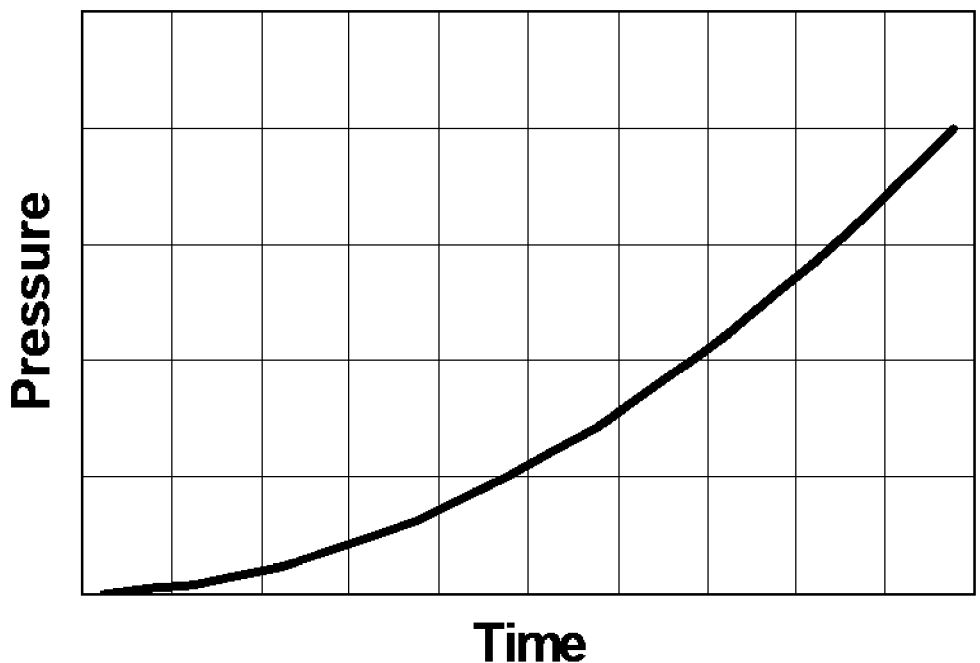
FIG. 2A illustrates a pressure profile showing a continuous rise in pressure.
Figure 2B:
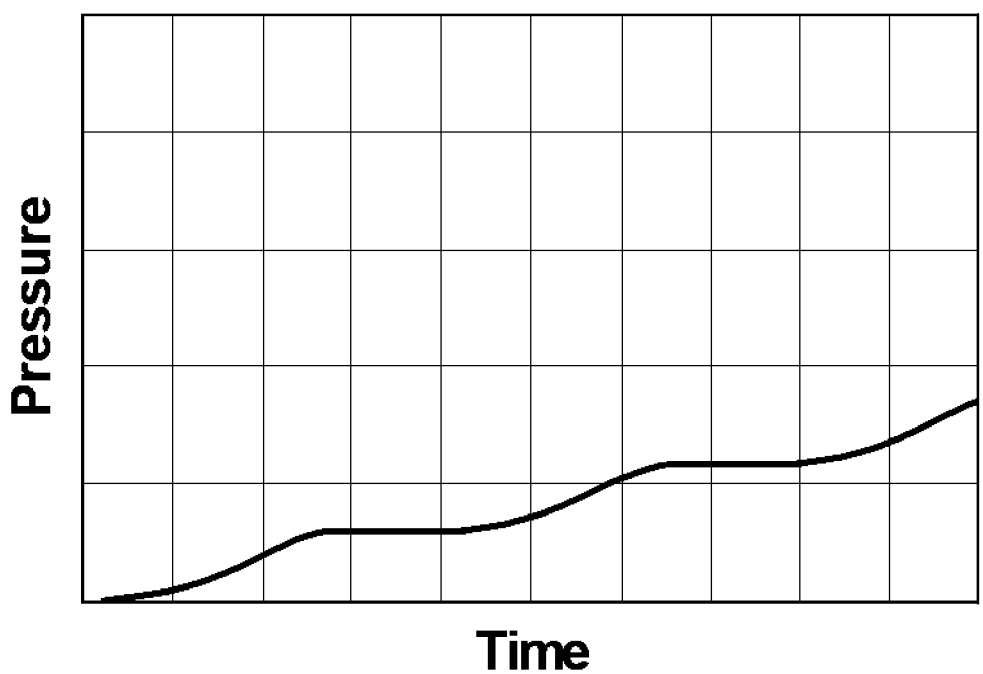
FIG. 2B illustrates a pressure profile showing an intermittent rise in pressure.

The controller then increases or decreases the speed of pump 14, as required, to maintain the flow rate within a flow range that provides for optimum pump efficiency. FIG. 2A illustrates a pressure profile showing a continuous rise in pressure. FIG. 2B illustrates a pressure profile showing an intermittent rise in pressure.

This method was developed for use with a pump that rotates, so that the rotations per minute (rpm) of the pump are increased or decreased in accordance with the control strategy. It will also work with other types of pumping apparatus. If the pressure profile shows a continuous rise in pressure, the system is working as intended and the operator or controller need only adjust the speed of the pump to maintain pump efficiency. If, however, the pressure profile shows an intermittent rise in pressure, this is a diagnostic indication of an inflow problem with the pump requiring remedial action. Such remedial action may involve slowing down the pump or may involve changing the annulus pressure.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A method of determining a flow rate of a pump, comprising:
    determining a volume capacity for a flow line carrying produced fluids from the pump;
    determining a starting pressure for the flow line;
    setting an arbitrary target pressure for the purpose of testing;
    preventing flow in the flow line while continuing to operate the pump;
    monitoring pressure in the flow line to determine a time interval required to reach the target pressure; and
    performing calculations to determine flow rate using the volume capacity, the starting pressure, the change in pressure over the time interval required to reach the target pressure, such calculations being based upon the fact that a change in pressure equals a change in volume $\Delta P=\Delta V$ in a closed system and flow rate is equivalent to $\Delta V$ divided by a change in time $\Delta T$.

2. The method of claim 1, including a step of using the derived flow rate calculations as part of a pump control strategy in which flow rates are kept within a predetermined operating range to optimize pump efficiency.

3. The method of claim 1, including a step of preparing a pressure profile of pressure rise over time that is used as a diagnostic tool to determine whether the pump is experiencing inflow problems.

4. An automated oil well pump control system, comprising:
    an oil well having a pump;
    a flow line carrying produced fluids from the oil well having a known volume capacity;
    an automated control valve for controlling the flow of produced fluids through the flow line;
    a pressure sensor on the flow line between the pump and the control valve;
    a controller controlling the speed of the pump, controlling the opening and closing of the control valve and receiving pressure readings from the pressure sensor, the controller having a control strategy in which the controller determines a starting pressure, closes the control valve and monitors a resulting rise in pressure in the flow line to an arbitrary target pressure over a time interval;
    the controller performing calculations to determine flow rate using the volume capacity, the starting pressure, the change in pressure over the time interval required to reach the target pressure, such calculations being based upon the fact that a change in pressure equals a change in volume $\Delta P=\Delta V$ in a closed system and flow rate is equivalent to $\Delta V$ divided by a change in time $\Delta T$; and
    the controller using the flow rate calculations to control pump speed within a predetermined operating range that optimizes pump efficiency.

* * * * *